United States Patent [19]

Choi

[11] Patent Number: 5,673,244
[45] Date of Patent: Sep. 30, 1997

[54] DISK LOADING AND MAGNETIC HEAD LIFTING MECHANISM USING A SINGLE POWER SOURCE FOR A MINIDISK PLAYER

[75] Inventor: Han-kook Choi, Suwon, Rep. of Korea

[73] Assignee: Samsung Electronics Co., Ltd., Kyungki-do, Rep. of Korea

[21] Appl. No.: 581,376

[22] Filed: Dec. 29, 1995

[51] Int. Cl.$^6$ ..................... G11B 17/04
[52] U.S. Cl. ............... 369/772; 360/99.07
[58] Field of Search ............. 360/99.02, 99.03, 360/99.06–99.07; 369/77.2, 75.2, 13

[56] References Cited

U.S. PATENT DOCUMENTS

| | | | |
|---|---|---|---|
| 5,130,869 | 7/1992 | Kikuya et al. | 369/77.2 |
| 5,153,792 | 10/1992 | Kawano | 360/99.06 |
| 5,184,342 | 2/1993 | Ishii | 369/77.2 |
| 5,309,421 | 5/1994 | Fujisawa | 369/77.2 |
| 5,452,271 | 9/1995 | Ohmori et al. | 369/75.2 |
| 5,500,838 | 3/1996 | Matsumoto et al. | 369/13 |
| 5,511,056 | 4/1996 | Choi | 369/77.2 |
| 5,537,376 | 7/1996 | Ikuma | 369/77.2 |

*Primary Examiner*—Stuart S. Levy
*Assistant Examiner*—Brian E. Miller
*Attorney, Agent, or Firm*—Sughrue, Mion, Zinn, Macpeak & Seas, PLLC

[57] ABSTRACT

A minidisk player for performing the operations of inserting and loading a disk cartridge and ascending and descending a magnetic head using a single power source (motor) is provided. A driving plate member slidably moves in the front and rear directions by a single motor, so that a holder for receiving the disk cartridge and a slide member 30 for guiding the ascending/descending of the holder also 7. move, and the magnetic head ascends/descends.

3 Claims, 6 Drawing Sheets

DISK LOADING AND MAGNETIC HEAD LIFTING MECHANISM USING A SINGLE POWER SOURCE FOR A MINIDISK PLAYER

BACKGROUND OF THE INVENTION

The present invention relates to a minidisk player, and more particularly, to a minidisk player having a simple disk loading/ejecting structure in which a magnetic head ascends/descends according to loading/ejecting of a disk.

Generally, a disk for storing high-density information is installed in a disk cartridge 170 for protecting the disk from dust and impact from the outside. Disk cartridge 170 has a shutter (not shown) for opening/closing an opening 171 through which part of a disk 160 is exposed, (see FIG. 8B for such a disk cartridge) and a shutter slot for opening the shutter is provided in the shutter.

In order to perform a recording/reproducing operation by introducing the disk cartridge 170 with the disk 160 into a player, a series of operations each for inserting disk cartridge 170 into the player, opening the shutter and loading the disk 160 onto a turntable are required. Also, the ascending/descending operation of the magnetic head, for contacting the magnetic head to the recording surface of the disk 160 when recording information in the disk 160, and for separating the magnetic head from the disk during the reproducing process, is required.

For the above operations, according to a conventional disk player, separate motors are required for performing the inserting/ejecting of the disk cartridge and the ascending/descending of the magnetic head. However, such a complicated structure requires a lot of components, thereby causing high power consumption.

SUMMARY OF THE INVENTION

To solve the above problems, it is an object of the present invention to provide a minidisk player for performing operations of inserting/ejecting a disk cartridge and ascending/descending a magnetic head with a simple structure.

To achieve the above object, there is provided a minidisk player comprising: a turntable for rotating a disk in a disk cartridge; an optical pickup for reading out information from the disk by irradiating light on the disk; a magnetic head for recording information on the disk; a main chassis on which the turntable is installed; a holder slidably installed in the main chassis, for receiving the disk cartridge; a guiding means for guiding the holder in a horizontal direction and a vertical direction with respect to the main chassis; a driving means for driving the holder; an ascending/descending means for ascending and descending the magnetic head so as to contact the magnetic head to the disk seated on the turntable and separating said magnetic head from the disk; and an ejecting means for ejecting the disk cartridge from the holder.

In the above minidisk player where guide slits are formed on the sidewall of the main chassis, each of the guide slits having horizontal and vertical guiding portions, the guiding means comprises: first guide pins protruded from the holder, which are slidably coupled to the guide slits; and a slide member, slidably installed between the main chassis and the holder, formed with slanted slits to which the first guide pins are slidably coupled and which are slanted with respect to the horizontal guiding portions of the guide slits, and having second guide pins slidably coupled to said guide slits of the main chassis, and wherein the holder is guided in the horizontal and vertical directions along the guide slits as the slide member horizontally moves.

Also, in the minidisk player where guide slits are formed on the sidewall of the main chassis, each of the guide slits having horizontal and vertical guiding portions, the driving means comprises: first guide pins protruded from the holder, which are slidably coupled to the guide slits; a slide member, slidably installed between the main chassis and the holder, formed with slanted slits to which the first guide pins are slidably coupled and which are slanted with respect to the horizontal guiding portions of the guide slits, and having second guide pins slidably coupled to said guide slits of the main chassis; a driving plate member slidably installed between the slide member and the holder, and formed with a coupling slit to which the first guide pins are coupled and a rack gear portion at the end of the driving plate member; and a motor for driving the rack gear portion.

The ascending/descending means comprises: a supporting member rotatably coupled to the main chassis for supporting the magnetic head; an interlocking pin fixed on the supporting member in a perpendicular direction with respect to the inserting direction of the disk cartridge; and an interlocking plate member installed on the holder, which is movable in the inserting/ejecting direction of the disk cartridge while being contacted to/separated from the interlocking pin, and wherein the supporting member rotates when the interlocking plate member is contacted to/separated from the interlocking pin.

Here, a leaf spring, which is extended from the interlocking plate member, has a first contact portion which initially contacts in parallel to the interlocking pin and a second contact portion which is extended from first contact portion with a concave shape.

On the other hand, the ejecting means comprises: an ejecting lever having a pushing piece which is vertically extended toward the inside of the holder to contact the end of the disk cartridge, and rotatably installed on the holder; a spring for elastically biasing the ejecting lever in the ejecting direction of the disk cartridge; and a locking means for locking/releasing the ejecting lever.

The locking means comprises: a stopper member of which one end portion is fixed on the main chassis and the other end portion is located on the holder, and having a guide side which is parallel with respect to the inserting/ejecting direction of the disk cartridge; and a roller member provided on the ejecting lever, which contacts the guide side as the disk cartridge is inserted into the holder, and wherein the ejecting lever rotates as the disk cartridge is inserted into the holder, and the roller member contacts the guide side as the holder moves in the inserting direction of the disk cartridge, thereby locking the ejecting lever.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENT

Figure 1:
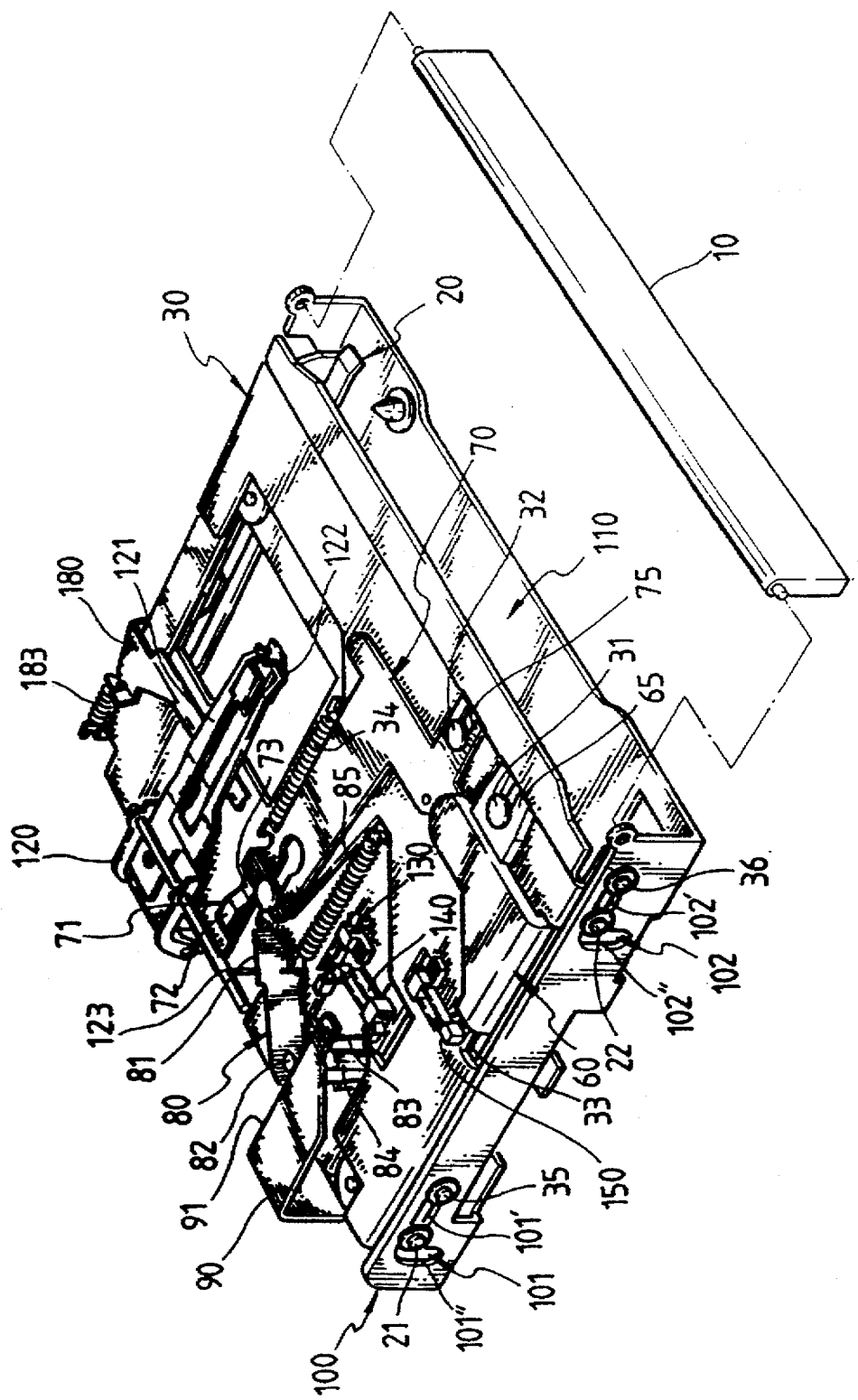
FIG. 1 is a perspective view of a minidisk player according to the present invention.

In a minidisk player of the present invention shown in FIG. 1, a main chassis 100 on which a turntable (see FIGS. 8A and 8B) for rotating a disk (not shown) and an optical pickup (see FIGS. 8A and 8B) for irradiating light onto the disk to read out information from the disk are provided, and a holder 20 for receiving a disk cartridge, which is horizontally and vertically guided with respect to main chassis 100 by a predetermined guiding means and moves by a predetermined driving means, are installed.

Also, a magnetic head 122 which ascends and descends by a predetermined ascending/descending means to be contacted to or separated from the disk, for recording/reproducing information on/from the disk seated on the turntable is installed, and an ejecting means for ejecting the disk cartridge from the holder 20 is provided.

Figure 5:
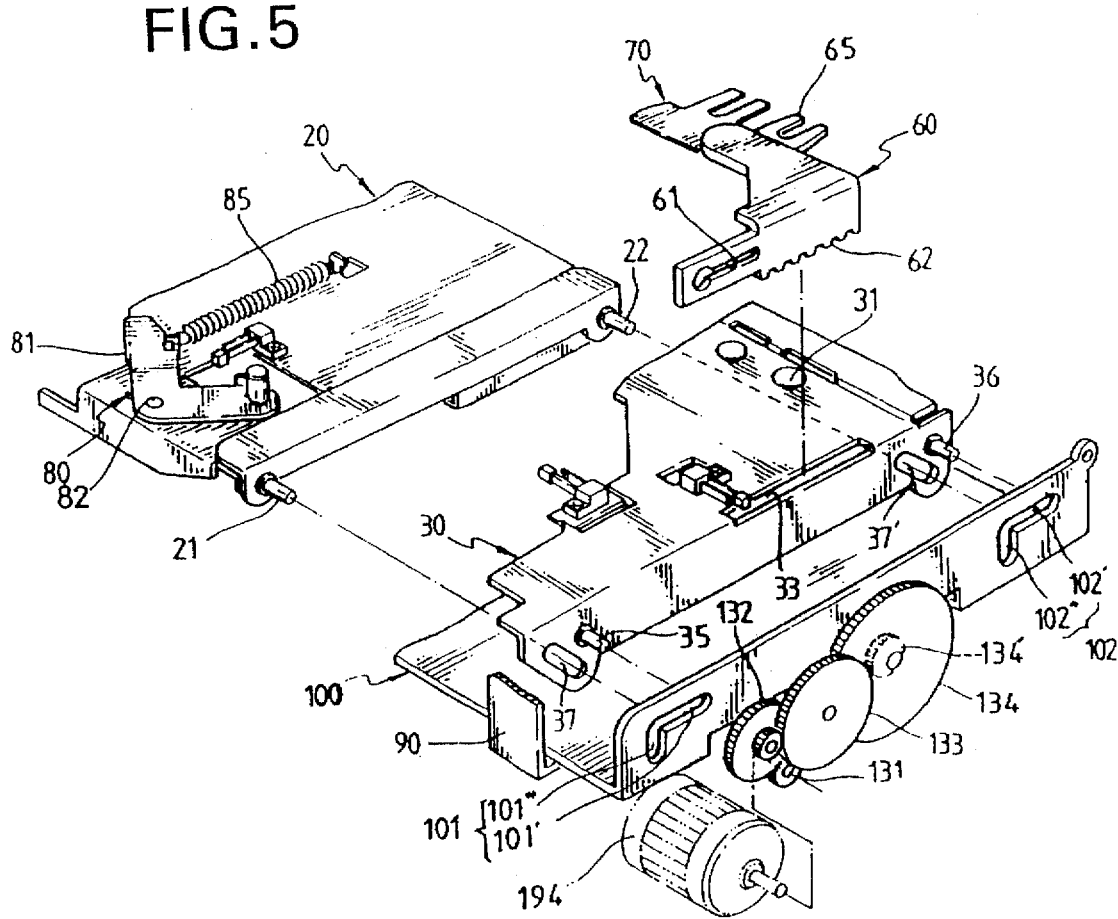
FIG. 5 is a partial exploded perspective view of the minidisk player according to the present invention.

The guiding means is constituted as follows. Referring to FIGS. 1 and 5, guide slits 101 and 102 having horizontal guiding portions 101' and 102' and vertical guiding portions 101" and 102" are formed in a sidewall of the main chassis 100. First guiding pins 21 and 22 slidably coupled to the guide slits 101 and 102 are formed on the holder 20. There is a slide member 30 of which two sides are slidably inserted into both spaces formed between the main chassis 100 and the holder 20. Slide member 30 has slanted slits 37 and 37' which are slanted with respect to horizontal guiding portions 101' and 102' of guide slits 101 and 102 and to which first guide pins 21 and 22 of the holder 20 are slidably coupled, and second guiding pins 35 and 36 which are slidably coupled to guide slits 101 and 102 of main chassis 100.

By the above guiding means, holder 20 can be guided in horizontal and vertical directions along guide slits 101 and 102 as slide member 30 moves in the horizontal direction.

The above driving means for moving holder 20 along the above guiding means is constituted as follows. Referring to FIG. 5, a driving plate member 60 is slidably installed between slide member 30 and holder 20, and has a coupling slit 61 with which first guide pin 22 are coupled and a rack gear portion 62. A motor (see FIG. 5) for providing power to driving plate member 60 is installed on main chassis 100 and a gear train for transferring power from the motor to rack gear portion 62 of driving plate member 60 is adopted. The gear train includes a driving gear 131 coupled to the shaft of the motor, 194 driven gears 134 and 134' which are in mesh with rack gear portion 62 of driving plate member 60, and a plurality of mid gears 132 and 133 for connecting driving gear 131 and driven gears 134 and 134'. Also, a guide pin 31 is formed on slide member 30 and a guide piece 65 to which guide pin 31 is introduced is formed in a side of driving plate member 60, so that driving plate member 60 can stably move while being guided by guide pin 31.

Figure 8A:
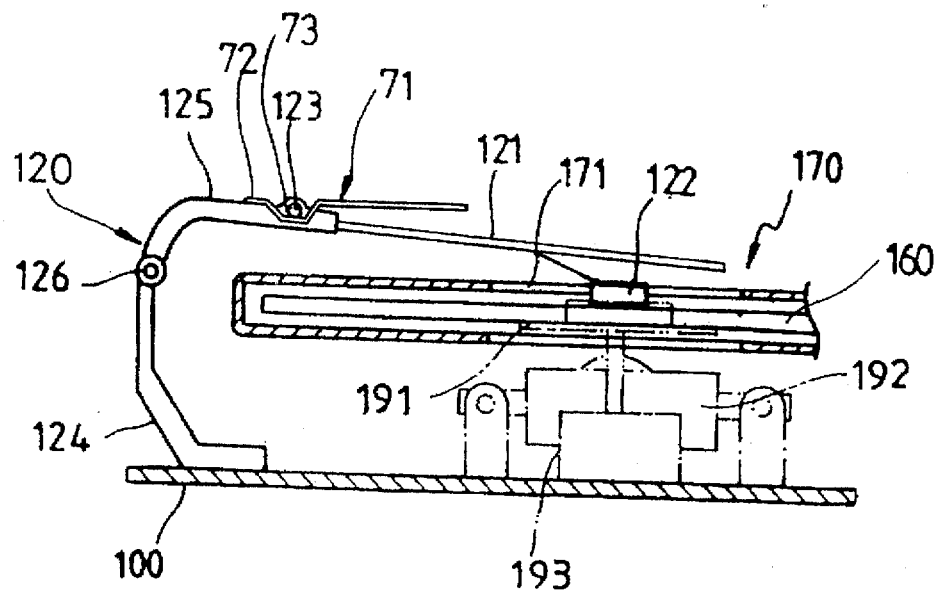
FIGS. 8A and 8B are schematic diagrams for illustrating the ascending/descending operation of a magnetic head.
Figure 8B:
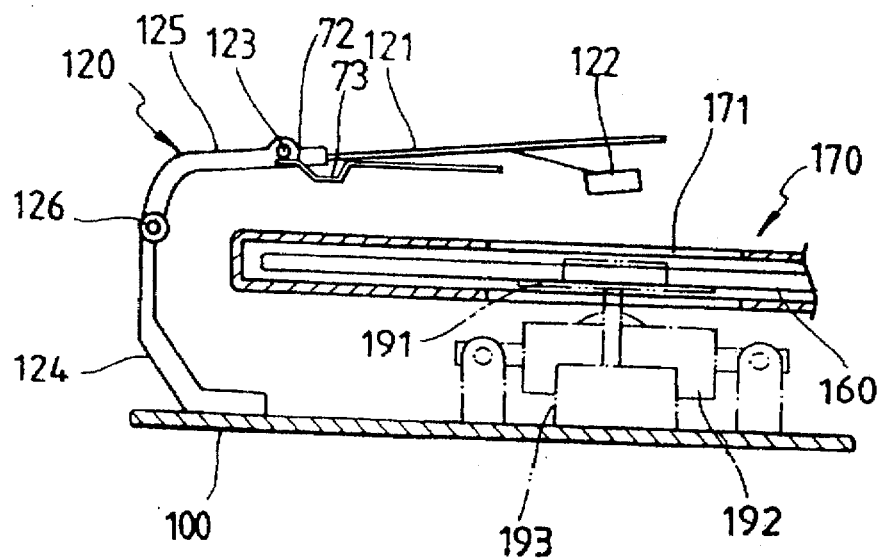
Figure 9:
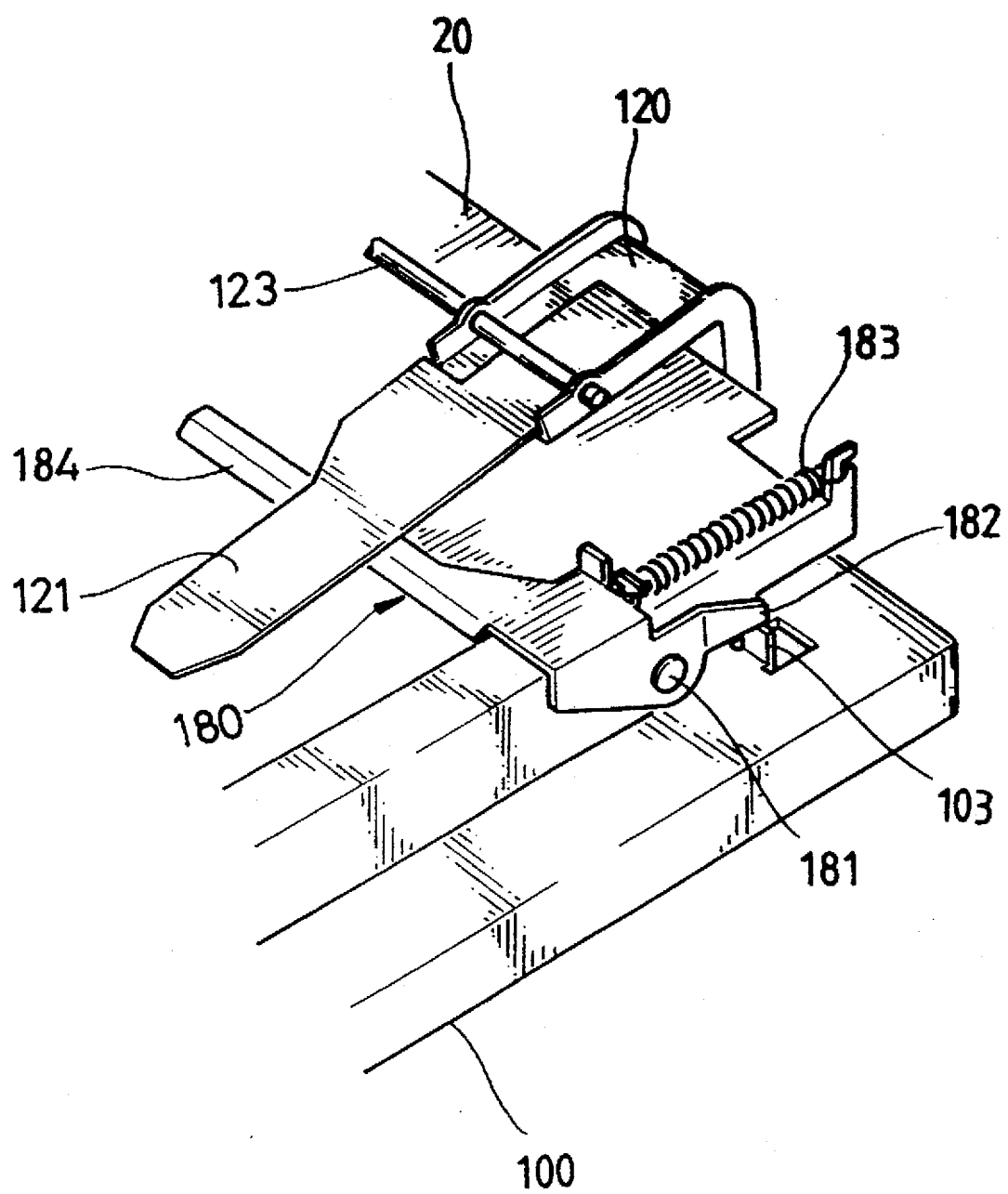
FIG. 9 is a partial perspective view schematically showing the minidisk player according to the present invention.

The ascending/descending means for ascending and descending the magnetic head 122 to be contacted to and separated from the disk is constituted as follows. Referring to FIGS. 1, 8A and 8B, there are provided a fixed portion 124 which is fixed on main chassis 100 and a supporting member 120 having a rotating portion 125 rotatably connected to the fixed portion 124 by a hinge portion 126. Also, a head lever 121 for supporting magnetic head 122 is attached to the leading end of rotating portion 125.

In addition, an interlocking pin 123 is fixed on the rotating portion 125 in the perpendicular direction with respect to the insertion of the disk cartridge 170. On the surface of slide member 30 slidably installed on holder 20, an interlocking plate member 70 which is movable while being coupled with driving plate member 60 is provided. A leaf spring 71, having a first contact portion 72 which initially contacts in parallel to the interlocking pin 123 and a second contact portion 73 which is extended from first contact portion 72 with a concave shape, is extended from the interlocking plate member 70. When first contacting portion 72 contacts the interlocking pin 123 by the movement of interlocking plate member 70, magnetic head 122 ascends as shown in FIG. 8B. On the other hand, when interlocking pin 123 contacts second contacting portion 73 by the further movement of interlocking plate member 70, magnetic head 122 descends to contact the disk 160, as shown in FIG. 8A. Here, interlocking plate member 70 is elastically connected with slide member 30 by a spring 34. Also, a guide pin 32 is formed on the slide member 30 and a guide piece 75 to which the guide pin 32 is introduced is formed in a side of the interlocking plate member 70. Thus, the interlocking plate member 70 can stably move while being guided by the guide pin 32.

On the other hand, the ejecting means for holding disk cartridge 170 into holder 20 and ejecting disk cartridge 170 from holder 20 is constituted as follows. Referring to FIGS. 1 and 5, an ejecting lever 80 with an "L"-like shape is rotatably installed on the holder 20 by a hinge 82. A pushing piece 81 which is downwardly extended toward the inside of holder 20 to contact the end of cartridge 170 is formed on the one end portion of ejecting lever 80. The one end portion of the ejecting lever 80 and holder 20 are connected by a spring 85. Ejecting member 80 is elastically biased in the ejecting direction of disk cartridge 170 by the spring 85. Also, a locking means is provided for locking/releasing the ejecting lever 80.

Figure 2:
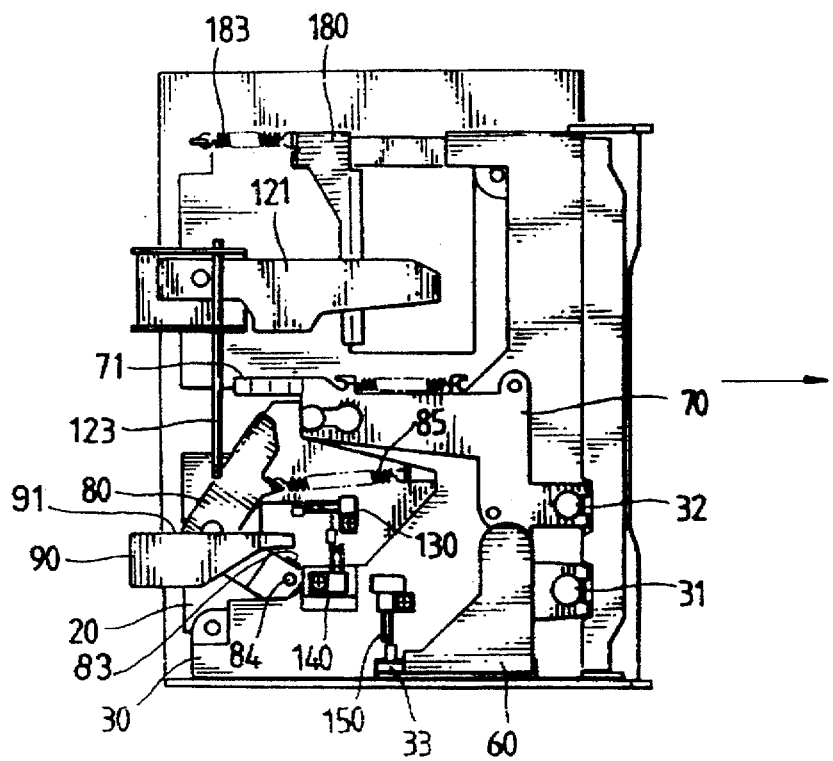
FIG. 2 is a plan view schematically showing the minidisk player shown in FIG. 1 prior to inserting a disk cartridge thereto.
Figure 3:
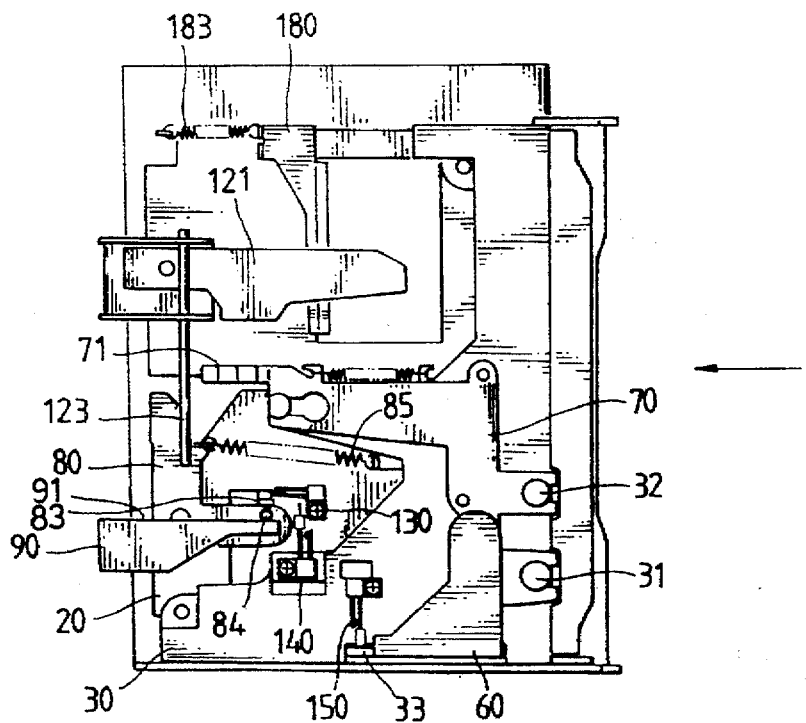
FIG. 3 is a plan view schematically showing the minidisk player shown in FIG. 1 when a disk cartridge is inserted thereto.

Referring to FIGS. 1 to 3, wherein FIG. 2 shows the state wherein the ejecting lever 80 is released and FIG. 3 shows the state wherein the ejecting lever 80 is in the locking state, respectively, the locking means will be described. As shown, a stopper member 90 having a guide side 91 which is parallel with respect to the inserting/ejecting direction of disk cartridge 170 is fixed to main chassis 100. A roller member 84, which contacts the guide side 91 as disk cartridge 170 is inserted into holder 20, is formed on the other end portion of ejecting lever 80. When disk cartridge 170 is inserted into the holder 20 to push the pushing piece 81, ejecting lever 80 rotates. Simultaneously, holder 20 moves in the inserting direction of disk cartridge 170, so that roller member 84 contacts guide side 91, thereby locking ejecting lever 80.

On the other hand, a first switch member 130 is installed on holder 20. Here, when cartridge holder 170 is inserted into holder 20 to rotate ejecting lever 80, the other end portion of ejecting lever 80 contacts the first switch member 130, thereby operating first switch member 130. A protrusion 83 which directly contacts first switch member 130 is formed on the other end portion of ejecting lever 80. Also, there are provided second and third switch members 140 and 150 on slide member 30, wherein the second switch member 140 operates when slide member 30 contacts roller member 84 in the other end portion of ejecting lever 80, and the third switch member 150 operates in contact with the driving plate member 60.

When the first switching member 130 operates, power is applied to the motor 194, and when the second switch member 140 operates, power is cut off. Also, when the third switch member 50 operates, power is applied to the motor, so that driving plate member 60 moves deep in the inserting direction of disk cartridge 170.

A door member 10 is rotatably coupled to the front end portion of main chassis 100, where an inserting hole 110 into which disk cartridge 170 is inserted is formed.

The operation of the minidisk player having the above structure according to the present invention will be described.

Figure 7:
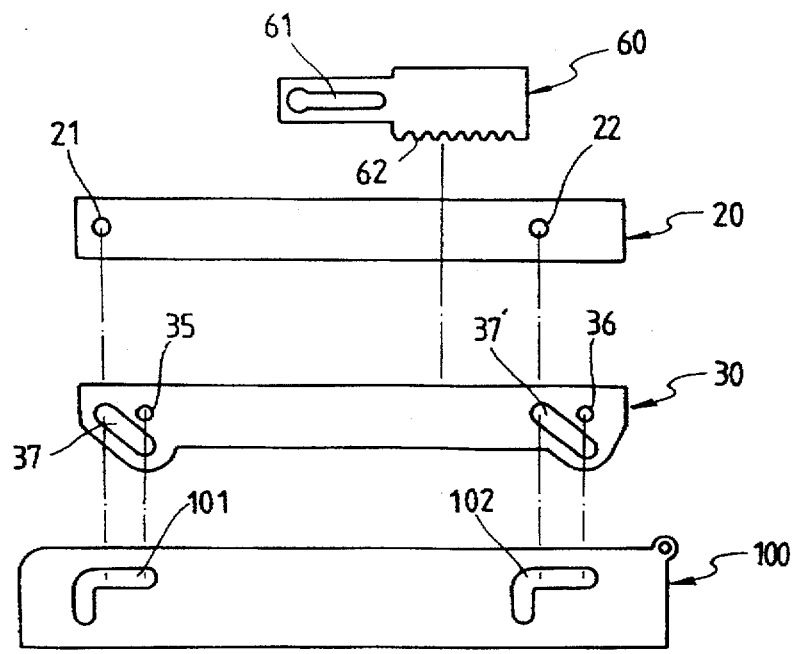
FIG. 7 is a schematic exploded diagram of a major portion of FIGS. 6A, 6B and 6C.

First, the operation of inserting the disk cartridge is as follows. Referring to FIGS. 1 to 3, disk cartridge 170 is pushed toward inserting hole 110 in the state of FIGS. 1 and 2. The door member 10 rotates toward the inside of inserting hole 110. When the leading end of disk cartridge 170 contacts pushing piece 81 of ejecting lever 80, pushing piece 81 rotates as shown in FIG. 3. The spring 85 is then elongated and protrusion 83 of pushing lever 80 contacts first switch member 130, so that power is applied to the motor 194, wherein the operation according to driving of the motor will be described later together with the disk loading operation. While protrusion 83 contacts first switch member 130 as described above, disk cartridge 170 is further inserted into the inside. The holder 20 is then introduced into the inside together with slide member 30. That is, referring to FIGS. 5 and 7, as holder 20 moves into the inside, first guide pin 22 moves along coupling slit 61 of driving plate member 60 which is at a standstill and then slide member 30 moves inside while being interlocked with first guide pin 22.

On the other hand, as shown in FIG. 3, holder 20 moves inside while ejecting lever 80 is rotated, so that roller member 84 of ejecting lever 80 is guided in contact with guide side 91 of stopper member 90. Thus, ejecting lever 80 is locked by stopper 90, thereby maintaining the insertion state of disk cartridge 170 against the restoring force of the spring 85.

Figure 6A:
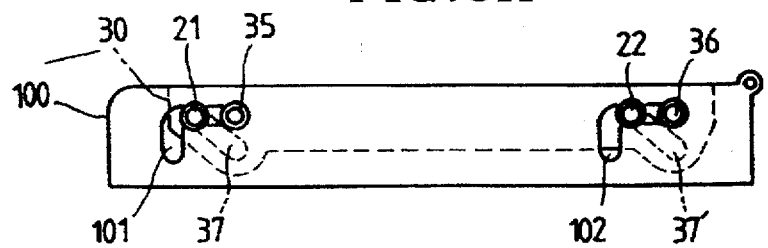
FIGS. 6A, 6B and 6C are schematic side views of a main portion of the minidisk player according to the present invention, for illustrating the operation thereof.
Figure 6B:
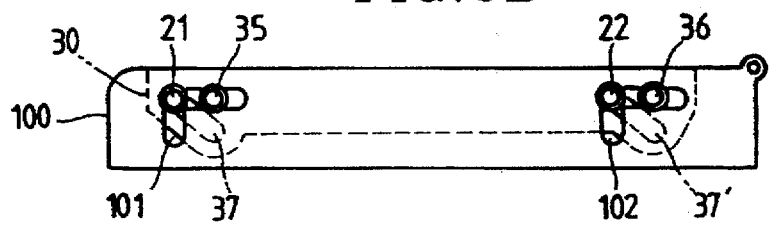

FIG. 6A is a schematic side view showing the initial state before disk cartridge 170 is inserted into holder 20 and FIG. 6B is a schematic side view showing the state where disk cartridge 170 is completely inserted into holder 20.

Second, the operations of loading a disk and performing reproduction therefrom will be described.

Figure 6C:
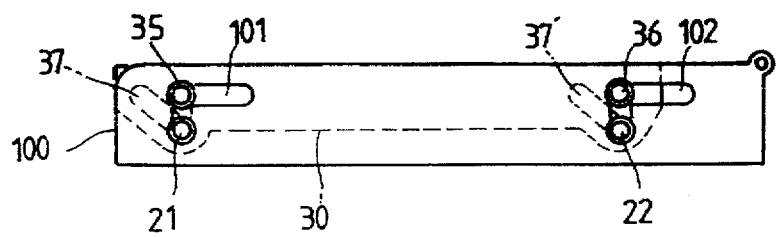

As described above, when protrusion 83 of ejecting lever 80 contacts first switch member 130 by the rotation of ejecting lever 80, power is applied to the motor 194. Thus, the state shown in FIG. 6B proceeds to the state shown in FIG. 6C. That is, referring to FIGS. 1 and 5, as driving gear 131 rotates, driven gear 134' in mesh with rack gear portion 62 of driving plate member 60 rotates via the plurality of gears 132, 133 and 134, thereby moving driving plate member 60 to the left. In this state interlocking plate member 70 coupled with driving plate member 60 moves in the same direction. During the above movement of driving plate member 60 and interlocking plate member 70, guide pieces 65 and 75 of driving plate member 60 and interlocking plate member 70 are guided by guide pins 31 and 32 formed on slide member 30, respectively, to stably move driving plate member 60 and interlocking plate member 70. Also, since slide member 30 is connected to interlocking plate member 70 by spring 34, slide member 30 moves together with driving plate member 60 by a predetermined distance.

As driving plate member 60, interlocking plate member 70 and slide member 30 move as described above, the holder 20 moves by first guide pins 21 and 22 coupled into slanted slits 37 and 37'. That is, when slide member 30 moves from the state of FIG. 6B to the state of FIG. 6C, first guide pins 21 and 22 are guided down along slanted slits 37 and 37' and vertical guiding portions 101" and 102" of guide slits 101 and 102 formed in main chassis 100, so that holder 20 descends. As a result, the disk in disk cartridge 170 is stably seated on the turntable 191.

Figure 4:
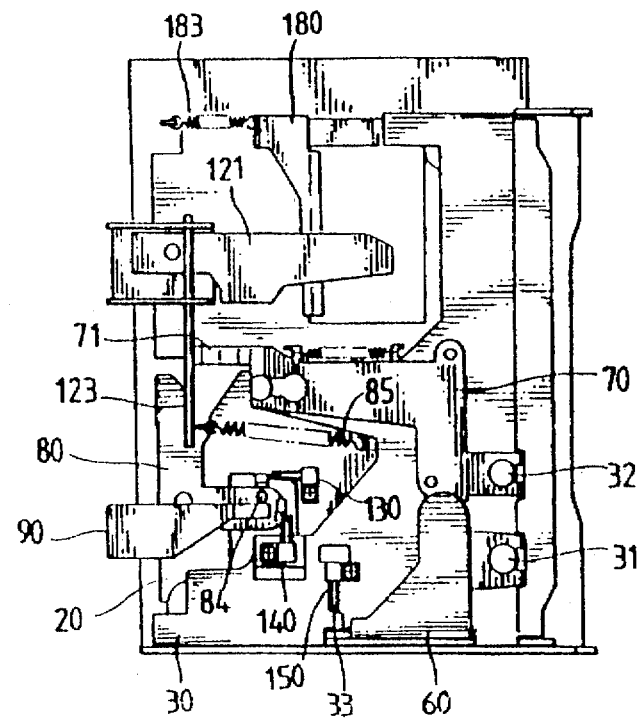
FIG. 4 is a plan view schematically showing the minidisk player shown in FIG. 1 when a disk is seated on a turntable.

Also, as the holder 20 descends, the interlocking plate member 70 simultaneously moves, so that first contact portion 72 of leaf spring 71 supports interlocking pin 123 installed in supporting member 120, as shown in FIGS. 4 and 8B.

On the other hand, as holder descends, when an extension piece 182 of a lever member 180, which is rotatably coupled with the sidewall of holder 20 by a hinge 181 and has one end portion 184 for supporting head lever 121, is caught into a protrusion 103, the lever member 180 rotates counterclockwise, so that head lever 121 can descend. In this state interlocking pin 123 remains in contact with first contact portion 72 of the interlocking plate member 70, so that head lever 121 does not descend anymore even if lever member 180 is released for rotation. Thus, even after the disk is seated on the turntable, magnetic head 122 does not contact the disk.

In the above state, information is read out from the disk by a spindle motor 193 and an optical pick up 192.

Third, when a record mode button is touched to record information on the disk by making the magnetic head 122 contact with the disk, power is applied to the motor, so that the driving plate member 60 further moves inside. Since the first and second guide pins 21, 22, 23 and 24 are caught in vertical guiding portions 101" and 102" of the guide slits 101 and 102, holder 20 and slide member 30 do not move any more and only driving plate member 60 moves inside. When driving plate member 60 moves inside, interlocking pin 123 comes into contact with the second contact portion 73 as shown in FIG. 8A. As a result, head lever 121 descends, and accordingly, magnetic head 122 contacts the disk. In this state, the recording operation is performed.

On the other hand, when driving plate member 60 moves and then the third switch member 150 operates by driving the plate member 60, power to the motor is cut off by the control of a microcomputer (not shown), so that overload to the motor is prevented.

The operation of ejecting the disk cartridge in the minidisk player according to the present invention is performed in the reverse sequence with respect to the operational sequence as described above. Briefly, when holder 20 moves back in the ejecting direction together with driving plate member 60 driven by the motor, roller member 84 of ejecting lever 80 is separated from guide surface 91 of stopper 90 and accordingly ejecting lever 80 rotates by the restoring force of spring 85, so that disk cartridge 170 is ejected by ejecting lever 80.

As described above, according to the minidisk player of the present invention, a series of operations for inserting disk cartridge 170, ascending/descending the magnetic head to load/separate the disk on/from the turntable, and contacting the magnetic head to the disk for recording are performed with a simple structure, wherein a single motor is adopted as a power source.

Therefore, the minidisk player of the present invention with such a simple structure solves the problems related with high power consumption and a complicated structure in the conventional disk player which adopts a plurality of motors each for inserting/ejecting the disk cartridge and ascending/descending the magnetic head, respectively.

What is claimed is:

1. A minidisk player comprising:

a turntable for rotating a disk in a disk cartridge;

an optical pickup for reading out information from the disk by irradiating light on the disk;

a magnetic head for recording information on the disk;

a main chassis on which said turntable is installed;

a holder, slidably installed in said main chassis, for receiving the disk cartridge;

a guiding means for guiding said holder in a horizontal direction and a vertical direction with respect to said main chassis;

a driving means for driving said holder;

an ascending/descending means for ascending and descending said magnetic head so as to contact said magnetic head to the disk seated on said turntable and separating said magnetic head from the disk; and an ejecting means for ejecting said disk cartridge from said holder, wherein said ascending/descending means comprises:

a supporting member rotatably coupled to said main chassis for supporting said magnetic head;

an interlocking pin fixed on said supporting member in a perpendicular direction with respect to an inserting direction of the disk cartridge; and an interlocking plate member installed on said holder, which is movable in the inserting direction and an ejecting direction of the disk cartridge while being contacted to and separated from, respectively, said interlocking pin, and wherein said supporting member rotates when said interlocking plate member is contacted with/separated from said interlocking pin.

2. A minidisk player comprising:

a turntable for rotating a disk in a disk cartridge;

an optical pickup for reading out information from the disk by irradiating light on the disk;

a magnetic head for recording information on the disk;

a main chassis on which said turntable is installed;

a holder, slidably installed in said main chassis, for receiving the disk cartridge;

a guiding means for guiding said holder in a horizontal direction and a vertical direction with respect to said main chassis;

a driving means for driving said holder;

an ascending/descending means for ascending and descending said magnetic head so as to contact said magnetic head to the disk seated on said turntable and separating said magnetic head from the disk; and an ejecting means for ejecting said disk cartridge from said holder, wherein said ascending/descending means comprises:

a supporting member rotatably coupled to said main chassis for supporting said magnetic head;

an interlocking pin fixed on said supporting member in a perpendicular direction with respect to an inserting direction of the disk cartridge; and an interlocking plate member installed on said holder, which is movable in the inserting direction and an ejecting direction of the disk cartridge while being contacted to and separated from, respectively, said interlocking pin, and wherein said supporting member rotates when said interlocking plate member is contacted with/separated from said interlocking pin, wherein said ascending/descending means further comprises a leaf spring which is extended from the interlocking plate member and which has a first contact portion which initially contacts in parallel to said interlocking pin and a second contact portion which is extended from the first contact portion with a concave shape.

3. A minidisk player comprising:

a turntable for rotating a disk in a disk cartridge;

an optical pickup for reading out information from the disk by irradiating light on the disk;

a magnetic head for recording information on the disk;

a main chassis on which said turntable is installed;

a holder, slidably installed in said main chassis, for receiving the disk cartridge;

a guiding means for guiding said holder in a horizontal direction and a vertical direction with respect to said main chassis;

a driving means for driving said holder;

an ascending/descending means for ascending and descending said magnetic head so as to contact said magnetic head to the disk seated on said turntable and separating said magnetic head from the disk; and an ejecting means for ejecting said disk cartridge from said holder, said ejecting means comprising:

an ejecting lever having a pushing piece which is vertically extended toward an inside of said holder to contact an end of the disk cartridge, and rotatably installed on said holder;

a spring for elastically biasing said ejecting lever in an ejecting direction of the disk cartridge; and a locking means for locking/releasing said ejecting lever, wherein said locking means comprises:

a stopper member of which one end portion is fixed on said main chassis and the other end portion is located on said holder, and having a guide side which is parallel with respect to an insertion direction and the ejecting direction of the disk cartridge; and a roller member provided on said ejecting lever, which contacts said guide side as the disk cartridge is inserted into said holder, and wherein said ejecting lever rotates as the disk cartridge is inserted into said holder, and said roller member contacts said guide side as said holder moves in the inserting direction of the disk cartridge, thereby locking said ejecting lever.

* * * * *